United States Patent [19]
Sakow et al.

[11] 3,844,583
[45] Oct. 29, 1974

[54] VEHICLE TORSION BAR

[76] Inventors: Toshihiko Sakow, 82 Copley Ave., Teaneck, N.J. 07666; Robert D. Pfister, 807 Kingswood Dr., Cary, N.C. 27511

[22] Filed: Feb. 21, 1973

[21] Appl. No.: 334,380

[52] U.S. Cl. .............................. 280/124 B, 267/57
[51] Int. Cl. .......................................... B60g 11/20
[58] Field of Search ................ 280/124 B, 106.5 R; 267/57, 154

[56] References Cited
UNITED STATES PATENTS

| | | | |
|---|---|---|---|
| 2,465,098 | 3/1949 | Inskeep | 280/124 B |
| 3,084,377 | 4/1963 | Foster | 267/154 |
| 3,436,069 | 4/1969 | Henschen | 267/154 |
| 3,752,246 | 8/1973 | Sullivan | 280/106.5 R |

*Primary Examiner*—Philip Goodman
*Assistant Examiner*—John A. Carroll
*Attorney, Agent, or Firm*—Howard C. Miskin

[57] ABSTRACT

A vehicle torsion bar wheel mounting includes a square tubular member fixed to the body frame and centrally housing a coupling block. Rectangular torsion bars are pivoted at their inner ends to the coupling block and at their outer ends to outwardly projecting shafts provided at their ends with radially extending arms proximate the ends of which are mounted transverse wheel supporting axles. An anchoring block slidably engages each of the torsion bars and the inside faces of the tubular member and is releasably fixed at any preset position by set screws available through a slot in the tubular member to permit the adjustment of the effective lengths of the torsion bars and the springing of the respective wheels by adjusting the point at which each torsion bar is fixed against axial rotation.

9 Claims, 5 Drawing Figures

PATENTED OCT 29 1974  3,844,583

VEHICLE TORSION BAR

BACKGROUND OF THE INVENTION

The present invention relates generally to improvements in vehicles such as trailers, campers, trucks, passenger automobiles and the like and it relates more particularly to an improved structure for spring mounting the wheels to a vehicle body or chassis.

The riding quality and control characteristics of a ground vehicle, such as of the type specified above greatly depends on the method of mounting or suspending the vehicle frame or body and the springiness of the connection between the wheels and the vehicle body. The optimum characteristics, in turn, depend on the qualities of the road, that is, whether it is smooth or rough, the curvature and grade of the road, the speed and acceleration of the vehicle, the loading of the vehicle and the like. It is a common practice to individually suspend the wheels by means of coil springs or torsion bars, but the amount of spring, that is relative vertical movement between the wheel and the body under shock and load is generally fixed and represents a compromise. Thus, vehicles which are sprung for certain loads and road conditions and desired riding qualities leave much to be desired when employed under other conditions.

SUMMARY OF THE INVENTION

It is a principal object of the present invention to provide an improved ground vehicle such as a passenger automobile, camper, trailer, truck or the like.

Another object of the present invention is to provide an improved ground vehicle spring suspension structure.

Still another object of the present invention is to provide an improved torsion bar vehicle wheel suspension.

A further object of the present invention is to provide an improved wheel torsion bar suspension system of adjustable spring.

Still a further object of the present invention is to provide a structure of the above nature characterized by its simplicity, ruggedness, reliability, wide range and ease of adjustment and high versatility and adaptability.

The above and other objects of the present invention will become apparent from a reading of the following description taken in conjunction with the accompanying drawing which illustrates a preferred embodiment thereof.

In a sense the present invention contemplates the provision of a wheel spring mounting which includes a longitudinally extending torsion bar mounted on a vehicle and axially twistable, a longitudinal wheel supporting axle transversely offset from the axis of the torsion bar and connected to its outer end, and means for anchoring the torsion bar against rotation at a longitudinally adjustable point spaced from the torsion bar outer end.

According to a preferred form of the improved mounting a longitudinal square tubular member extends across and is affixed to the vehicle body and houses a centrally located coupling block. Rectangular torsion bars extend from opposite ends of the coupling block and are pin connected thereto and terminate at points short of the ends of the tubular member. A round shaft is pin connected to the outer end of each torsion bar and projects through the end of the tubular member and terminates in a radial axle supporting arm, a wheel being mounted on each axle. An anchoring block is associated with each torsion bar and is slidably housed in the tubular member and has a transverse cross-section corresponding to that of the tubular member bore. Each anchoring block has a rectangular longitudinal bore slidably engaging the torsion bar to rotate therewith, and a set screw engages a tapped transverse bore in the anchor block to permit its releasable locking to the torsion bar at any desired point.

Thus, with the present simple and rugged structure the resilience or spring of the wheel suspension may be easily and rapidly adjusted to provide optimum characteristics in accordance with the road and load conditions.

DESCRIPTION OF THE PREFERRED EMBODIMENT

Figures 1, 2, 3, 4, 5:
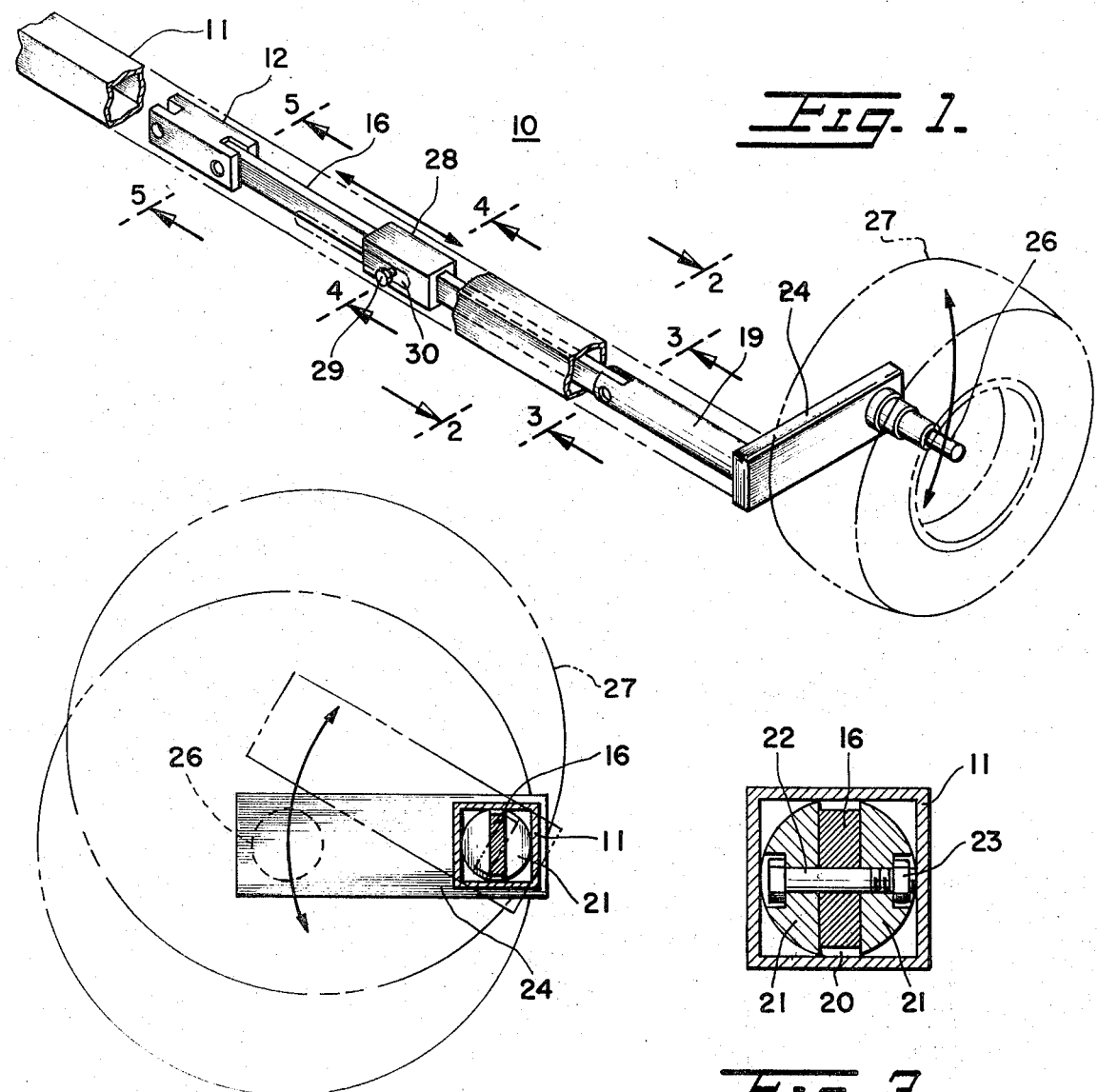
FIG. 1 is a fragmentary perspective view of a wheel suspension structure embodying the present invention.
FIG. 2 is a sectional view taken along line 2—2 in FIG. 1 showing the torsion bar under high and low stress conditions by broken and solid lines respectively.
FIG. 3 is an enlarged sectional view taken along line 3—3 in FIG. 1.
FIG. 4 is an enlarged sectional view taken along line 4—4 in FIG. 1.
FIG. 5 is an enlarged sectional view taken along line 5—5 in FIG. 1.

Referring now to the drawing which illustrates a preferred embodiment of the present invention, the reference numeral 10 generally designates the improved wheel mount structure which suspends a section of any desired vehicle such as a trailer, camper, truck or the like. The mount structure 10 includes a horizontal longitudinal steel tube 11 of square transverse cross section, which extends across and is secured advantageously to the underface of the vehicle body, chassis or frame, depending on the type and structure of the vehicle. Housed in tube 11 intermediate its end is a coupling blcok 12 having external peripheral dimensions corresponding to the peripheral dimensions of the bore of tube 11 so as to be firmly positioned therein. A vertical slot 13 is formed in each end of the block 12 to form a corresponding yoke delineated by a pair of longitudinal side arms 14.

A rectangular torsion bar 16 extends from each end of coupling block 12 to points short of the ends of tube 11 and is of a height less than that of the bore of tube 11 and greater than the width of the torsion bar 16. The inner end of each torsion bar 16 is sandwiched between a pair of yoke arms 14 and is pinned thereto by a bolt 17 engaging aligned transverse bores formed in torsion bar 16 and yoke arms 14, the head of bolt 17 and a nut 18 engaging the threaded opposite end of bolt 17 resting in counterbores formed in the outside faces of yoke arms 14. The torsion bars 16 are formed of any suitable material, for example, a spring steel and extend to points short of the outer ends of tube 11.

A circular shaft 19 of a diameter approximately equal to the width of the bore in tube 11 extends from the outer end of each of the torsion bars 16 to the outer ends of tube 11 and are axially rotatable in the tube 11. The inner end of each shaft 19 has a vertical slot 20 delineating a pair of yoke defining side arms 21. The end of a corresponding torsion bar 16 is sandwiched between each pair of yoke side arms 21 and is secured thereto by a bolt 22 engaging aligned transverse bores in torsion bar 16 and side arms 21 and having a threaded end engaged by a nut 23. The head of bolt 22 and nut 23 next in counterbores formed in the outer faces of yoke side arms 21.

Affixed to the outer end of each shaft 19 proximate the outer ends of tube 11 and rockable with shaft 19 is a radially extending arm or bar 24, the arms or bars 24 being parallel and extending horizontally, when the torsion bars 16 are in an unstressed condition. An axle 26 is mounted to the free end of each arm 24 and extends outwardly therefrom parallel to shafts 19. A wheel 27 is rotatably supported by each of the axles 26 and may be of any desired construction. In order to adjust the spring of the wheel mount 10 each of the torsion bars 16 is provided with a longitudinally adjustable slide or anchoring block 28 which prevents the rotation of the respective torsion bar 16 at the outermost point of engagement thereof by the corresponding anchoring block 28. Each anchoring block 28 has an outer perimeter corresponding to the bore of tube 11 but with its edges rounded and is easily slidable in the tube 11 but is prevented from rotation therein. Each anchoring block 28 has a longitudinal rectangular bore corresponding in cross section to that of torsion bar 16 and slidably engaged by the torsion bar 16 whereby angular movement of the torsion bar 16 relative to anchor block 28 is prevented.

Each of the anchor blocks 28 is provided with a horizontal transverse tapped bore communicating with the longitudinal bore and engaged by a suitable set screw 29. The set screw 29 projects transversely beyond the block 28 through a longitudinal slot 30 formed in a wall of tube 11 adjacent the set screw 29 to permit access to the set screw 29 and the longitudinal movement thereof with the respective anchoring block 28.

In the operation of the mount structure 10 described above, any steady or impact loading between the wheels 28 and the vehicle body supported in the tube 11 is borne by the torsion bars 16 by way of radial arms 24 and shafts 19, the spring and relative movement between the vehicle and wheels 28 being determined by the torque resistance of the torsion bars 16 which, in turn, is a function of the effective lengths thereof. Accordingly to soften or increase the spring of the wheel mount structure 11 the effective lengths of the torsion bars 16 are increased by merely loosening the set screw 29, sliding the anchoring bars 28 inwardly toward the coupling bar 12 by the desired amount and then tightening the set screws 29. To stiffen or reduce the spring of wheel mount 10, the set screws 29 are loosened, the blocks 28 moved outwardly and the set screws then tightened. The springiness or softness is a direct function of the effective lengths of the torsion bars 16, that is the distance between their outer ends and the outer end faces of respective anchoring blocks 28 since at the junction point of the torsion bar 16 and the outer end face of the anchoring block 28 the torsion bar is anchored and prevented from rotating.

The present invention allows easy adjustability of the degree of torque resistance of the vehicle. The springiness between the vehicle and the wheels can be varied readily by the user depending load or the like.

While there has been described and illustrated a preferred embodiment of the present invention, it is apparent that numerous alterations, omissions and additions may be made without departing from the spirit thereof.

What is claimed is:

1. A vehicle wheel spring mounting comprising a longitudinally extending torsion bar, a longitudinally extending wheel supporting axle, means connecting said axle to an outer portion of said torsion bar and transversely offset from the longitudinal axis of said torsion bar for rocking with said outer portion about said longitudinal axis characterized by means for releasably locking said torsion bar against axial rotation at an adjustable preselected point along the length of said torsion bar inwardly of said outer portion.

2. The mounting of claim 1 wherein said locking means comprises a slide member longitudinally movable along said torsion bar and rotatable therewith, means restricting the rotation of said slide member, and means releasably locking said slide member in an adjustable preselected position against longitudinal movement.

3. The mounting of claim 2 wherein said torsion bar is of non-circular transverse cross section and said slide member comprises a block having a longitudinal bore of a transverse cross section corresponding to that of said torsion bar and slidably engaging said torsion bar.

4. The mounting of claim 3 wherein said block is of non-circular transverse cross section and said slide member rotation restricting means comprises a longitudinally extending tubular member housing said torsion bar and having an internal transverse cross section corresponding to that of said slide member, said slide member being slidable along said tubular member.

5. The mounting of claim 4 wherein said connecting means comprises a shaft extending through the outer end of said tubular member and connected at its inner end to the outer end of said torsion bar and a radial arm mounted in the outer end of said shaft and supporting said axle at its outer end.

6. The mounting of claim 4 comprising a coupling member disposed in said tubular member intermediate its ends and restricted against rotation about the longitudinal axis, a pair of said torsion bars housed in said tubular member and having their inner ends connected to said coupling member, one of said slide members engaging each of said torsion bars and one of said axles being connected to each of said torsion bars.

7. The mounting of claim 6 wherein said tubular member is of square transverse cross section.

8. The mounting of claim 6 wherein said torsion bars are pivoted to said coupling member.

9. A vehicle wheel spring mounting comprising a longitudinally extending torsion bar of non-circular transverse cross section, a longitudinally extending wheel supporting axle, means connecting said axle to an outer portion of said torsion bar and transversely offset from the longitudinal axis of said torsion bar for rocking with said outer portion about said longitudinal axis, and means for releasably locking said torsion bar against axial rotation at an adjustable preselected point along the length of said torsion bar inwardly of said outer portion and including a block having a longitudinal bore of a transverse cross section corresponding to that of said torsion bar and slidably engaging said torsion bar and having a tapped transverse bore communicating with said longitudinal bore and a set screw engaging said tapped bore and said torsion bar, and means restricting the rotation of said block.

* * * * *